Aug. 28, 1956

H. E. KIMES 2,760,550

TIRE CEMENTING APPARATUS

Filed Oct. 21, 1953

INVENTOR.
Harold E. Kimes
BY
Gary, Desmond & Parker
Attys.

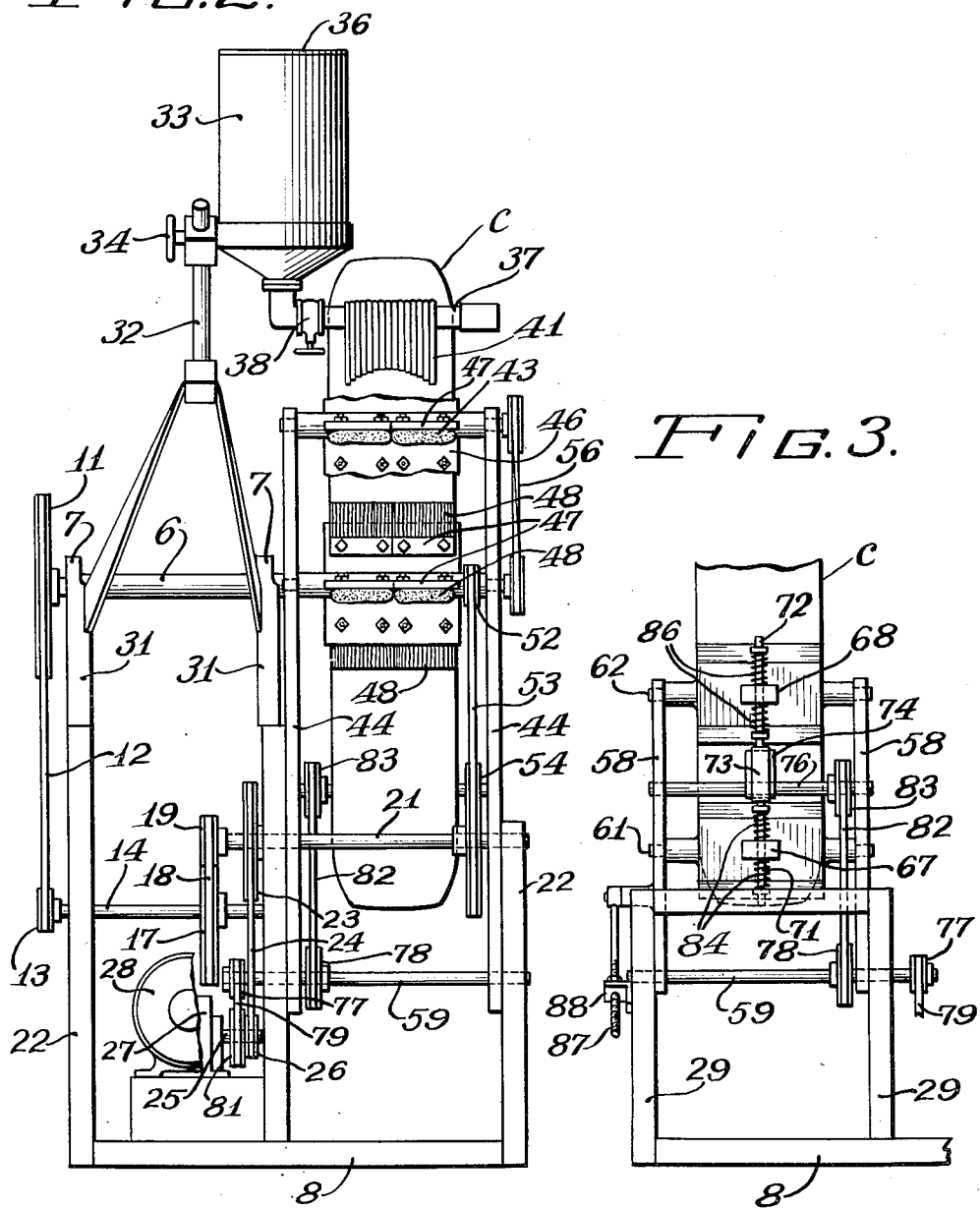

United States Patent Office 2,760,550
Patented Aug. 28, 1956

2,760,550

TIRE CEMENTING APPARATUS

Harold E. Kimes, Freeport, Ill.

Application October 21, 1953, Serial No. 387,424

6 Claims. (Cl. 154—9)

This invention relates to apparatus for applying cement to pneumatic tire casings during treading or retreading of the casings.

Prior to treading or retreading of a tire casing, the outer surface of the casing is roughened and then coated with cement to secure a camelback thereto. To effect a proper bond between the casing body and its tread portion, it is necessary that the cement be evenly and uniformly applied to the casing body. In shops engaged in retreading tire casings, it is conventional practice to manually brush the cement onto the casing. It will be appreciated that such a practice does not insure a uniform coating of cement and a resultant uniform bond between the casing body and its tread portion. It is also apparent that the manual application of cement to tire casings by means of brushes is a relatively expensive process, due to the waste of cement and the time consumed by the workman. It is, therefore, an object of the present invention to provide an apparatus adapted to quickly apply a uniform coating of cement to tire casings with minimum effort by the operator.

In the retreading of worn tire casings, it is not uncommon to process casings having cuts, recesses, etc. in their outer surfaces. While the walls defining such cuts, etc., should be coated with cement, it is not desirable to leave such cuts filled with cement as the cement forms gas bubbles between the casing and camelback during vulcanization. It is, therefore, another object of the invention to provide an apparatus embodying means for cement coating the walls defining such cuts, recesses, etc. and for removing excess cement therefrom.

A further object of the invention resides in the provision of a tire cementing apparatus which is relatively simple and inexpensive in construction and reliable in operation.

Another object of the invention resides in the provision of an apparatus adapted for use in applying cement to tire casings of different sizes.

This invention embodies other novel features, details of construction and arrangement of parts which are hereinafter set forth in the specification and claims and illustrated in the accompanying drawings, wherein:

Figs. 2 and 3 are end elevational views of same.

Figure 1:
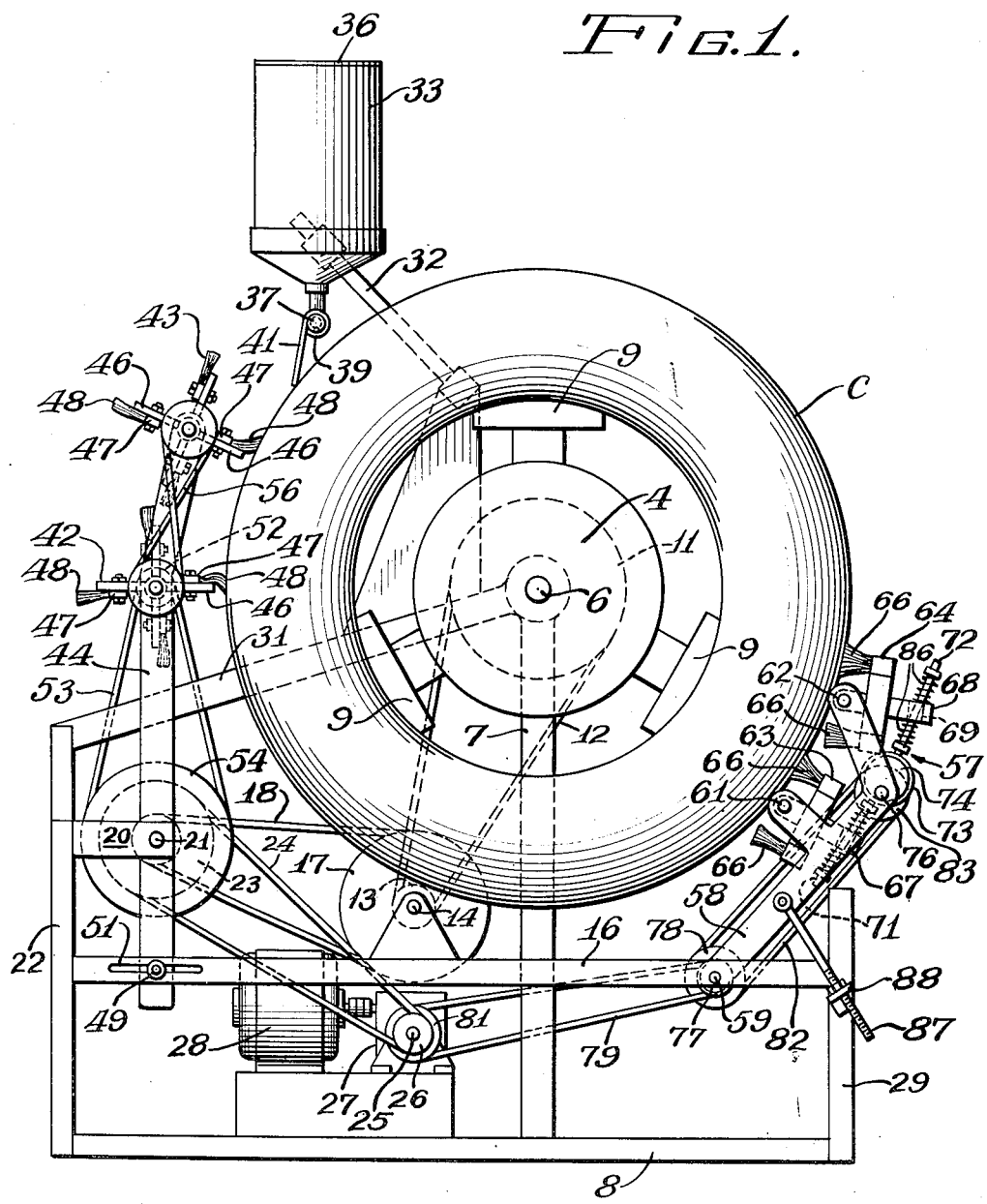
Fig. 1 is a side elevational view illustrating a tire cementing apparatus embodying features of the invention.

Referring now to the drawings for a better understanding of the invention, the tire cementing apparatus is shown as comprising a conventional chuck 4 secured on the end of a shaft 6 journaled for rotational movement in suitable bearings provided at the upper end of upright frame members 7—7 mounted on a base 8. The chuck 4 may be of any suitable design or construction embodying a plurality of radially adjustable jaws 9 adapted to engage or disengage the bead portion of a tire casing C responsive to rotational movement of the usual jaw actuating member (not shown).

A driven sprocket 11 is keyed to the shaft 6 for engagement by an endless chain 12 extending around a driving sprocket 13 keyed to an intermediate shaft 14 journaled in suitable bearings provided on longitudinal frame members 16—16. A driven sprocket 17 is keyed to the shaft 14 for engagement by an endless chain 18 which extends around a driving sprocket 19 keyed to a brush driving shaft 21 journaled in suitable bearing brackets 20—20 provided on adjacent end frame members 22.

A driven sprocket 23 is keyed to the shaft 21 for engagement by an endless chain 24 which extends around a driving sprocket 26 keyed to the shaft 25 of a conventional speed reducing unit 27 connected to an electric motor 28 mounted on the base 8.

The longitudinal frame members 16—16 are secured at their ends to end frame members 22 disposed adjacent one end of the base 8 and to end frame members 29—29 secured to and extending upwardly from the other end of the base. To reinforce the upright frame members 7—7, braces 31—31 are provided to connect the upper ends of said members to the end frame members 22—22.

A bracket 32 is secured to and projects upwardly from the braces 31—31 to support a tank 33 adapted to house a supply of fluid cement for application to the outer periphery of the tire casing C, the tank being adjustably positioned along the bracket by means of locking screw 34. A removable cover 36 is provided on the upper open end of the tank, and a discharge conduit 37 extends downwardly and thence laterally from the lower end of the tank. A valve 38 is provided in the conduit 37 adjacent the tank to control the flow of cement from the latter, and the conduit is formed with a plurality of spaced apertures or ports 39 for the passage of streams of cement onto the tire casing.

A plurality of relatively movable rods 41 are pivotally mounted on the conduit 37 with their lower ends resting upon the tire casing to spread the cement over that portion of the casing to be cemented to the camelback.

A pair of vertically spaced brush elements 42 and 43 are journaled for rotational movement on upright support members 44—44 mounted adjacent their lower ends on the frame members 16—16 and brackets 20—20. Each brush element is shown as comprising a frame having radially disposed arms 46 to support brush backs 47 having bristles 48 thereon, the brush backs being secured to their respective arms by means of screws and being removable for cleaning or replacement when worn out.

The support members 44—44 are preferably journaled on the shaft 21 with their lower ends secured to their related frame members 16—16 by bolts 49—49 which extend through slots 51—51 in the frame members to permit pivotal adjustment of the support members relative to the chuck 4 to accommodate casings of different diameters.

A driven sprocket 52 is secured to the brush element 42 for engagement by an endless chain 53 which extends around a driving sprocket 54 keyed to the shaft 21. Driving and driven pulleys, secured to the brush elements 42 and 43, respectively, are interconnected by an endless belt 56 to drive the brush element 43 in a reverse direction to the direction of rotation of the brush element 42, as indicated by the arrows in Fig. 1.

While the brush elements 42 and 43 are adapted to spread the cement in a uniform layer or coating over the periphery of the casing free of cuts, recesses, etc., it is apparent that additonal coating means is required to coat the walls of such recesses and to remove excess cement therefrom to prevent the formation of gas bubbles during vulcanizing of the camelback onto the casing. Such additional coating means is shown as comprising a stippling device indicated generally at 57.

The stippling device is shown as comprising brush support arms 58—58 mounted for common pivotal movement on a shaft 59 journaled at its ends in the frame members 16—16. Shafts 61 and 62 extend between the arms 58—58 to pivotally support identical brush members 63 and 64, respectively, intermediate their ends. Each brush member is provided at opposite ends thereof with a tuft of bristles 66 for alternate engagement against the tire casing C.

The brush members 63 and 64 are provided with arms 67 and 68, respectively, formed with apertures 69 to slidably receive actuating rods 71 and 72, respectively. Adjacent ends of the rods are secured to a collar 73 journaled on an eccentric 74 keyed to a shaft 76 which is journaled at its ends on the arms 58—58. A pair of idler sprockets 77 and 78 are secured to a shaft 59 to be driven by an endless chain 79 extending around the sprocket 77 and a driving sprocket 81 keyed to the shaft 25. An endless chain 82 extends around the idler sprocket 78 for driving engagement with a driven sprocket 83 keyed to the shaft 76. Helical compression springs 84—84 and 86—86 are mounted on rods 71 and 72, respectively, to alternately engage opposite sides of related arms 67 and 68 during rotation of the eccentric 74.

To accommodate tire casings of different sizes, the stippling device 57 is pivotally adjustable about the shaft 59 by means of a bolt 87 which is pivotally connected to an arm 58 and extends through an aperture in a bracket 88 secured on a frame member 29.

In the operation of the apparatus thus described for applying cement to the outer surface of a tire casing, the casing C is first mounted in position upon the chuck 4 and engaged by the chuck jaws 9 for rotational movement about the axis of the shaft 6. As the casing is rotated, the valve 38 is opened to permit cement to flow by gravity through axially spaced apertures 39, formed in the pipe 37, onto the outer surface of the tire casing which is rotated in a counterclockwise direction as illustrated in Fig. 1. The cement thus applied to the casing is spread across the outer surface thereof by the pivotally supported depending rods 41, and is then brushed along the surface of the tire casing by means of the rotary brushes 42 and 43 to provide a uniform coating of cement on the outer surface of the casing. The stippling brushes 63 and 64 are actuated to engage the ends of the bristles 66 against the outer surface of the tire casing to coat the walls defining grooves or cuts in the tire casing and to remove excess cement from such grooves or cuts. As is well known in this art, a small pool of cement within a cut or groove in the tire casing will result in the formation of gas bubbles during vulcanization of a camelback onto the casing.

While this invention has been shown in but one form, it is obvious to those skilled in the art that it is not so limited, but is susceptible of various changes and modifications without departing from the spirit and scope of the claimed invention.

I claim as my invention:

1. In a cementing apparatus, means to rotate a tire casing about a horizontal axis, means to feed cement by gravity onto the outer surface of the casing, rod means to spread the cement over said outer surface, rotary brush means to distribute the cement evenly over said outer surface, and stippling brush means operative to remove excess cement from recesses in said outer surface.

2. In a cementing apparatus, means to rotate a tire casing about a horizontal axis, means to feed cement by gravity onto the outer surface of the casing, rod means to spread the cement over said outer surface, rotary brush means to distribute the cement evenly over said outer surface, stippling brush means operative to remove excess cement from recesses in said outer surface, said stippling brush means including a brush member having a tuft of bristles thereon and projecting therefrom, and means to move said brush member to alternately engage and disengage the ends of the tuft of bristles with the outer surface of said casing.

3. In a cementing apparatus, means to rotate a tire casing about a horizontal axis, means to feed cement by gravity onto the outer surface of the casing, rod means to spread the cement over said outer surface, rotary brush means to distribute the cement evenly over said outer surface, stippling brush means operative to remove excess cement from recesses in said outer surface, said stippling brush means including a brush member having a tuft of bristles thereon and projecting therefrom, means to move said brush member to alternately engage and disengage the ends of the tuft of bristles with the outer surface of said casing, said stippling brush member being supported for pivotal movement on a support arm, and means to adjust the position of said support arm relative to said axis.

4. In a tire cementing apparatus, a chuck rotatably mounted on a frame to engage and support a tire casing, means to rotate said chuck, means to direct streams of cement onto the downwardly moving side of the tire casing, means to spread the cement in an even coating over the outer surface of the casing, and stippling brush means operative to remove excess cement from recesses in said surface.

5. In a tire cementing apparatus, a chuck rotatably mounted on a frame to engage and support a tire casing, means to rotate said chuck, means to direct streams of cement onto the downwardly moving side of the tire casing, means to spread the cement in an even coating over the outer surface of the casing, and stippling brush means operative to remove excess cement from recesses in said surface, the last mentioned means including tufts of bristles movable into and out of engagement with said surface.

6. An apparatus according to claim 5 in which the tufts of bristles are mounted on opposite ends of a brush back journaled intermediate its ends for pivotal movement, and means to oscillate said brush back about its journal.

References Cited in the file of this patent

UNITED STATES PATENTS

| 546,216 | Arbuckle | Sept. 10, 1895 |
| 1,723,206 | Pino | Aug. 6, 1929 |
| 1,876,967 | Krause et al. | Sept. 13, 1932 |
| 2,425,332 | Langdon | Aug. 12, 1947 |